(12) United States Patent
Leeser et al.

(10) Patent No.: US 7,833,916 B2
(45) Date of Patent: Nov. 16, 2010

(54) ENERGY EFFICIENT AND INSULATED BUILDING ENVELOPES

(75) Inventors: Daniel Leeser, Framingham, MA (US); Christopher Blair, Littleton, CO (US); Daniel Bullock, North Attleboro, MA (US); Sara Rosenberg, Bolton, MA (US); Poongunran Muthukumaran, Arlington, MA (US)

(73) Assignee: Aspen Aerogels, Inc., Northborough, MA (US)

( * ) Notice: Subject to any disclaimer, the term of this patent is extended or adjusted under 35 U.S.C. 154(b) by 19 days.

(21) Appl. No.: 11/174,117

(22) Filed: Jun. 29, 2005

(65) Prior Publication Data

US 2007/0004306 A1    Jan. 4, 2007

Related U.S. Application Data

(60) Provisional application No. 60/583,940, filed on Jun. 29, 2004, provisional application No. 60/616,887, filed on Oct. 7, 2004.

(51) Int. Cl.
| | |
|---|---|
| *B32B 5/18* | (2006.01) |
| *B32B 5/24* | (2006.01) |
| *B32B 5/26* | (2006.01) |
| *B32B 9/04* | (2006.01) |
| *C03C 14/00* | (2006.01) |
| *E04F 13/00* | (2006.01) |
| *E04F 15/00* | (2006.01) |
| *E04F 15/18* | (2006.01) |
| *E04F 19/00* | (2006.01) |

(52) U.S. Cl. ............ 442/117; 442/59; 442/164; 442/170; 442/171; 428/307.3; 428/317.9; 428/316.6; 501/12; 52/27; 52/90.1; 52/506.01

(58) Field of Classification Search .......... 442/417, 442/76, 77, 394–399
See application file for complete search history.

(56) References Cited

U.S. PATENT DOCUMENTS

| | | | | |
|---|---|---|---|---|
| 2,893,962 | A | * | 7/1959 | Bartell ................ 442/76 |
| 4,684,568 | A | | 8/1987 | Lou |
| 5,091,235 | A | | 2/1992 | Vergnano |
| 5,306,555 | A | * | 4/1994 | Ramamurthi et al. ...... 442/63 |
| 5,374,477 | A | | 12/1994 | Lawless et al. |
| 6,125,645 | A | * | 10/2000 | Horn ................ 62/259.3 |
| 6,602,809 | B1 | | 8/2003 | Cabrey |

(Continued)

FOREIGN PATENT DOCUMENTS

DE    10212866 A1    10/2003

(Continued)

OTHER PUBLICATIONS

"Interface." Merriam-Webster Online Dictionary. 2008. Merriam-Webster Online. May 13, 2008.*

(Continued)

*Primary Examiner*—Jennifer A Chriss
(74) *Attorney, Agent, or Firm*—Poongunran Muthukumaran

(57) ABSTRACT

The present invention provides several methods and materials for use in building construction that may require air and water barrier, and water vapor permeability along with thermal or acoustic insulation. Several embodiments provide materials for a variety of building construction needs that can help build next generation green buildings.

19 Claims, 2 Drawing Sheets

U.S. PATENT DOCUMENTS

| | | | |
|---|---|---|---|
| 6,706,225 B2 | 3/2004 | Cabrey | |
| 7,118,801 B2 * | 10/2006 | Ristic-Lehmann et al. | 428/292.1 |
| 2002/0061396 A1 * | 5/2002 | White | 428/293.4 |
| 2002/0164447 A1 | 11/2002 | Asgian | |
| 2003/0003284 A1 * | 1/2003 | Schwertfeger et al. | 428/292.1 |
| 2004/0009732 A1 | 1/2004 | Nowak | |
| 2005/0100728 A1 * | 5/2005 | Ristic-Lehmann et al. | 428/323 |

FOREIGN PATENT DOCUMENTS

| | | |
|---|---|---|
| WO | WO99/30899 A1 | 6/1999 |
| WO | WO02/052086 A2 | 7/2002 |
| WO | WO2005/047381 A1 | 5/2005 |

OTHER PUBLICATIONS

Patent Abstracts of Japan, vol. 1996, No. 06; Jun. 28, 1996 & JP 08 034678 A (Matsushita Electric Works Ltd), Feb. 6, 1996.

* cited by examiner

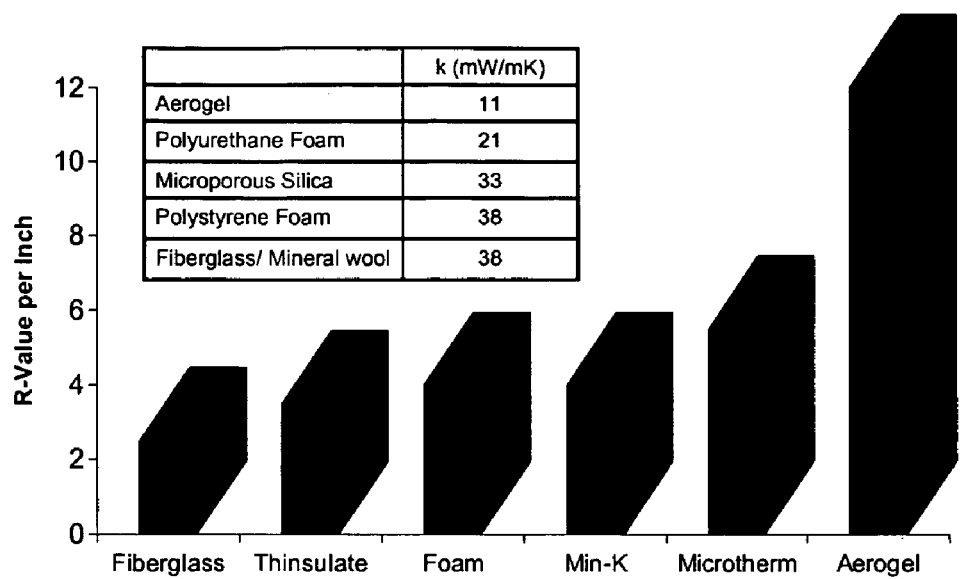
Figure 1. Aerogels have the highest known insulation value.
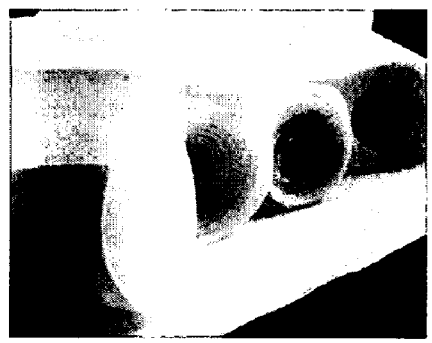
Figure 2. Aerogel wraps.

ENERGY EFFICIENT AND INSULATED BUILDING ENVELOPES

RELATED APPLICATIONS

This application claims the benefit of provisional patent applications Ser. No. 60/583,940 filed on Jun. 29, 2004 and Ser. No. 60/616,887 filed Oct. 7, 2004, both of which are hereby incorporated in their entireties as if fully set forth.

DISCUSSION

Polymer coated papers and water resistant sheathing materials are known to be useful in the construction industry, for preventing the infiltration of air and water to the interior of a building while allowing the outward passage there through of moisture vapor. Such materials may be flexible and used as building "wraps," or may be rigid and used as structural or decorative panels in the exterior walls or roofs of buildings.

Breathable building wraps, also referred to as housewraps, are used and provide advantages in the construction of wall and roof assemblies. These housewrap materials improve energy loss through reduction of air infiltration as well as acting as a weather barrier by preventing water intrusion into the building. It is a requirement that these materials are breathable, as defined by a minimum level of water vapor transmission rate (WVTR). Two popular materials that are manufactured for housewrap that achieve the combination of a barrier to water intrusion and air infiltration while remaining permeable to water vapor are a flash spunbonded polyolefin that may be obtained from DuPont under the name Tyvek.™. A second material is a microporous polyolefin film composite and may be obtained from Simplex Products under the trademark "R-Wrap™" Besides the popular brands, there are a variety of other brands such as Typar® from Reemay, Amowrap® from Teneco building products, Barricade® from Simplex, PinkWrap® from Ownes Corning and others.

Porous polyolefin films composites are used in housewrap applications. Housewrap materials must be permeable to gases as to allow water vapor to escape from the wall to which the film is secured. Otherwise, condensation of the water vapor trapped inside the wall may occur which leads to rotting and the growth of fungus, mold and mildew which may damage the wall. The film must be sufficiently impervious to air to insulate the wall against wind and water intrusion. Further, the film must have adequate tensile and physical properties such as break strength, elongation, tear strength, shrinkage and puncture strength to avoid damage during installation.

Porous polyolefin films may be prepared by stretching a precursor film filled with calcium carbonate. "Breathable" films which are gas/vapor permeable and liquid impermeable have been described in U.S. Pat. No. 4,472,328, assigned to Mitsubishi Chemical Industries, Ltd, which is incorporated here by reference in its entirety. The Mitsubishi patent describes a breathable polyolefin film prepared from a polyolefin/filler composition having from 20 percent to 80 percent by weight of a filler such as a surface treated calcium carbonate. A liquid or waxy hydrocarbon polymer elastomer such as a hydroxy-terminated liquid polybutadiene was found to produce a precursor film that could be monoaxially or biaxially stretched to make a film breathable. The breathable film described by Mitsubishi is also described in Great Britain Patent No. 2,115,702, assigned to Kao Corporation, which is incorporated here by reference in its entirety. The Kao patent further describes a disposable diaper prepared with a breathable film as disclosed by the Mitsubishi patent. The breathable film is used as a backing for the diaper to contain liquid.

Providing a proper weather barrier material is critical to today's energy efficient buildings. However, it still does not address any heat loss that can take place through the building envelopes. Currently, the majority of the heat that escapes a residential home exits through the floor, walls, and ceilings. For maximized energy efficiency, the Model Energy Code of the Council of American Building Officials calls for walls and ceilings to be insulated to R19 and R38respectively. Current 2×4" wall construction allows for 3.5" of fiberglass insulation, which is rated at R-11. Given the losses due to wooden studs, plywood exterior, etc, the overall wall R-value can drop as low as R-9.6. In order to meet the Model Energy Code, one option is to increase the wall construction to 2×6, such that thicker insulation can be installed. The 2×6 construction also allows for 24" stud spacing. However, this increased stud spacing can also create bowing in external walls, and also increases the cost of the lumber and insulation. According to a report done by the U.S. Department of Energy, a less expensive way of increasing the overall R-value is to install thicker insulated sheathing. Not only would this provide higher R-values, but also, the continuity of the form would better seal the home from the elements.

Current home sheathings, such as DuPont's Spun bonded polyolefins like Tyvek®, are widely used as a weatherizing membrane to block both water and air from penetrating into the home structure. Such systems are carefully designed to serve the desired purpose while also allowing water vapor to escape. In the past, it was not necessary to restrict the movement of air, since the typical "leaky" construction methods allowed air to flow freely and thus quickly dry out any moisture that may have entered the wall cavity. However, with better thermal insulation, the water vapor temperature can drop quickly when isolated from the heat of the building interior, causing condensation and trapping water. As such, it is necessary to seal the exterior of a building from moisture and air permeation, while still allowing water vapor to escape.

Other external sheathings, such as extruded polystyrene or polyisocyanurate insulated foam boards, provide increased R-value external to the home, and in some cases, can act as a weatherizing barrier. However, these materials can be expensive, and also, if exposed to an ignition source, are highly flammable and produce very dense and highly toxic smoke. As such, these materials must often be protected by at least 0.5" of gypsum board or a metal foil as a fire barrier, further adding to the cost. Additionally, although some of these foam boards also provide protection from the weather elements, the seams between adjacent boards are still susceptible to infiltration.

Aerogels describe a class of material based upon their structure, namely low density, open cell structures, large surface areas (often 900 $m^2/g$ or higher) and nanometer scale pore sizes. Supercritical and subcritical fluid extraction technologies are commonly used to extract the solvent from the fragile cells of the material. A variety of different aerogel compositions, both organic and inorganic are known in the art. Inorganic aerogels are generally based on metal alkoxides and include materials such as silica, carbides, and alumina. Organic aerogels include carbon aerogels and polymeric aerogels such as polyimide aerogels.

Low density aerogels (0.02-0.2 g/cc) based on silica are excellent insulators, better than the best rigid foams with thermal conductivities of about 14 mW/m-K and below at 100° F. and atmospheric pressure. In some cases one can make aerogels with thermal conductivities less than about 14 mW/mK. Aerogels function as thermal insulators primarily by minimizing conduction (low density, tortuous path for heat transfer through the nanostructures), convection (very small pore sizes minimize convection), and radiation (IR suppressing dopants may easily be dispersed throughout the aerogel matrix). Depending on the formulation, they can function well at temperatures of 550° C. and above.

Aerogels in the wider sense, i.e. in the sense of "gel having air as dispersion medium", are produced by drying a suitable gel. The term "aerogel" in this sense embraces aerogels in the narrower sense, xerogels and cryogels. A dried gel is an aerogel in the narrower sense when the liquid of the gel has been removed at temperatures above the critical temperature and starting from pressures above the critical pressure. If, by contrast, the liquid of the gel is removed subcritically, for example through formation of a liquid-vapor boundary phase, the resulting gel is termed a xerogel. It is to be noted that the gels of the embodiments of the present disclosure are aerogels, in the sense of gel having air as dispersion medium.

BRIEF DESCRIPTION OF THE DRAWINGS

FIG. 1 describes insulation value of various insulation materials.

FIG. 2 describes an illustration of aergoel wraps.

DESCRIPTION OF THE INVENTION

Figure 3:
FIG. 3 describes a structure with an aerogel layer 2 and a vapor permeable layer 1.

The invention provides a material comprising a component permeable to water vapor attached to an aerogel component. The component permeable to water vapor may thus be considered as breathable while remaining substantially impervious to air and water such that wind and rain does not pass through. In some embodiments, this component is a polymeric or cellulosic material. The material may be in a form flexible enough for, or suitable for, being rolled up. In additional embodiments, the component permeable to water vapor is in a sheet or substantially planar form (such as, but not limited to, a paper-like planar form) comprising essentially two surfaces wherein one surface is attached to the aerogel component. The aerogel component is optionally also present as a sheet or substantially planar form while attached to the component permeable to water vapor.

In some embodiments of the invention, the material is manufactured in a form for use in building construction. The material is insulation against air, water and heat movement across the material. The present invention also provides building construction materials, such as a housing wrap, comprising a breathable material (or component) with an aerogel material (or component). The presence of the aerogel material (or component) provides the building construction material with enhanced thermal insulation properties. In some embodiments, the building construction material is in a building wrap form, or other form that is used in building construction.

As explained above, the breathable material (or component) is substantially impervious to air and water while permeable to water vapor. The material (or component) may be a polymeric material or a cellulosic material. Optionally, the material (or component) comprises fibers or a fibrous material which provides a support to the material.

The present invention also provides methods to make a building construction material or housing wrap that incorporates both the weathering capabilities of a construction material such as Typar® from Reemay, Spun bonded polyolefins like Tyvek® from Dupont, Amowrap® from Teneco building products, Barricade® and R-wrap® from Simplex, Pink-Wrap® from Owens Corning, with the superior thermal performance of the aerogel blanket.

The invention addresses the manufacturing approaches and level of insulation needed to provide a viable, low cost, and highly effective product. Analysis has shown that providing such a barrier could provide over 0.48 Quads of energy savings in residential homes for market penetration of merely 30%.

By applying the superior thermal properties of aerogels to a residential insulation solution, significant energy savings can be gained. One challenge in combining the home wraps with aerogels is ensuring that the moisture vapor is still allowed to escape, while eliminating penetration of water. Good weather resistive barrier has four equally important functions: high level of air resistance, high level of water resistance, moderate to high level of vapor permeability, and high level of durability.

In the some embodiments of the invention, the aerogel material (or component) would be laminated or encapsulated for durability in the system. Aerogel material can be prepared to have a highly hydrophobic surface. Because the aerogel also provides air and water resistance, the outer wrap must only maintain the vapor permeation present in current home wrap systems. The aerogel materials can be made to allow a vapor permeation of about 100 to over 400 $g/m^2$ day per ASTM E-96, Method B, which is in the range of water vapor transfer rate of spun bonded polyolefin (Tyvek) like materials. As such, the aerogel will not limit vapor transmission as compared to current systems. Of course aerogel materials with a vapor permeation of about 150, about 200, about 250, about 300, or about 350 $g/m^2$ day per ASTM E-96, Method B, may also be used.

Silica sols can be prepared from hydrolyzed tetraethylorthosilicate typical of those known to those skilled in the art (Brinker, C. J. and G. W. Sherer, *Sol-Gel Science: The Physics and Chemistry of Sol-Gel Processing*. 1990, New York: Academic Press., and The Chemistry of Silica: Solubility, Polymerization, Colloid and Surface Properties and Biochemistry of Silica by Ralph K. Iler (Author), 1979, John Wiley and Sons, New York which are incorporated by reference here). Trialkylsilylating agent can be used to impart strengthening and hydrophobicity properties to the aerogel (such silylation is known in the art and described in literature such as U.S. Pat. No. 3,122,520 which is incorporated here by reference).

Other aerogels which may be used in the practice of the invention are described in U.S. Pat. No. 6,068,882 and U.S. patent application Ser. No. 10/034,296. These documents disclose examples of a fiber-reinforced aerogel composite material that can be practiced with the embodiments of the present invention. Non-limiting aerogel materials used in the embodiments of the present invention are those like Cryogel™, Pyrogel®, or Spaceloft™ sold commercially by Aspen Aerogels, Inc. However, any aerogel material can be used in conjunction with the elements of the present invention. It could be in particulate form, monolithic form or in composite form. Aerogel particles can be applied to layers, monoliths processed with weatherizing layers or aerogel composites designed to coexist with fibrous structures can be used with the embodiments of the present invention.

Two key challenges exist in developing an insulated home wrap: packaging the system to meet the needs of the home-building community, and meeting a price point to allow market penetration. The present invention addresses and solves both of those challenges. The aerogel insulated building construction material, or home wrap, can be manufactured via multiple options. One option would be to laminate or bond the aerogel blanket between external layers. The external layers can be any polymeric material. They can also be a material that is used as an air barrier on its own. Examples of such material includes spunbonded polyethylene like Tyvek™ from DuPont. The external layers would protect the aerogel and also offer the weather protection that is currently supplied by Spun bonded polyolefins like Tyvek®.

Another option is to infuse the aerogel material with an existing product, in order to enhance the properties and include thermal performance. An aerogel blanket can be made by infusing a non-woven batting with the aerogel precursor in liquid form; upon drying, the unique aerogel pore structure is created, co-mingled around the non-woven material for integral strength. In this same manner, the aerogel could be formed into another existing product, including Spun bonded polyolefins like Tyvek® or other product in a roll form. In other words, a fibrous batting of a polyolefin (such as spunbonded polyethylene) and an aerogel precursor in liquid form can be combined, mixed or infused with each other and subsequently dried.

The second challenge is the cost reduction. The homebuilding market is incredibly sensitive to cost, and as such, it is essential that the product developed be competitive in that arena. The current research activities in aerogel and aerogel blanket manufacturing provide several ways to reduce the cost and be competitive in this area.

Aerogel material can be combined with weatherizing material in several ways. They can be layered through lamination of the aerogel blanket with weatherizing material or by bonding them together using an adhesive or mechanically attaching them together. FIG. 3 illustrates such a structure with aerogel 2 is bonded mechanically or through an adhesive to another vapor permeating layer 1. It is noted here that any blockage of pores by the adhesives may be minimized in the practice of the invention. This may be achieved by controlling the thickness of the adhesive used. Alternatively, adhesives can be used only in certain spots thereby reducing the resistance to water vapor permeation posed by the adhesives.

Figure 4:
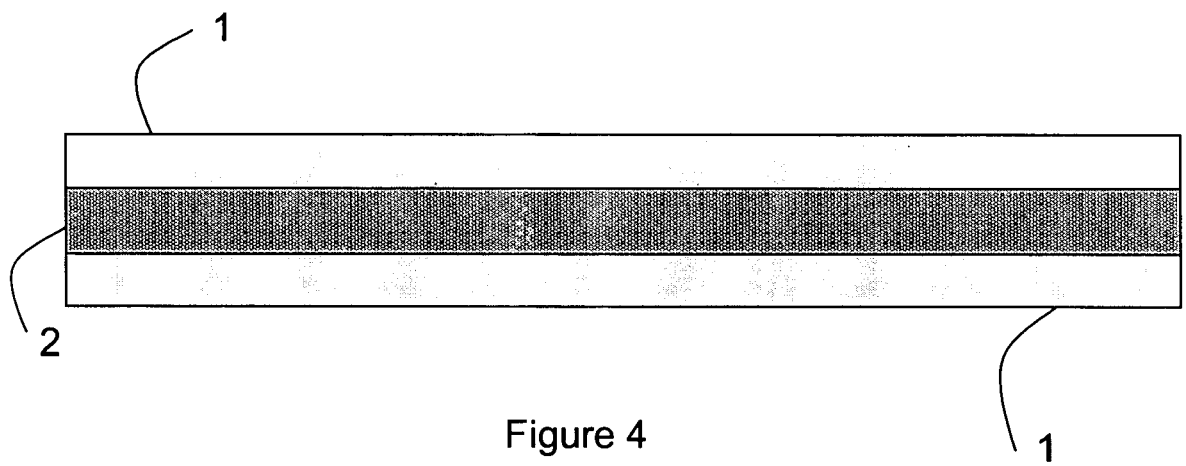
FIG. 4 describes a structure with an aerogel layer 2 sandwiched between two vapor permeable layers 1.

An aerogel layer can be sandwiched between two layers if weatherizing material or between a layer of weatherizing material and another layer of another material. Additional layers can be provided in this structure. FIG. 4 illustrates such a structure in which aerogel material 2 is layered between vapor permeating layers 1. For example, a foil can be added to block heat radiation. More than one layer of aerogel material can be provided. They can be separated by another layer or they can be provided in such a way that aerogel layers are touching each other. Such structures can be manufactured through lamination of all said layers. A mechanical fastening means can also be used to hold the layers together. Staples, pins, and variety of plastic fasteners are available in the art to perform such a function.

Additional vacuum or a pressure less than atmospheric can be provided between layers for specific applications like high-end insulation. Aerogels, by virtue of noncombustible nature of silicon dioxides, provide better fire protection than the other insulation materials used currently.

In other embodiments, the aerogel material is made substantially impermeable to both air and water, while still allowing the transmission of water vapor. Air barrier nature can be demonstrated in the fact that they can generate a huge pressure drop to any flow of air. As such, durability is the only additional factor that needs consideration in the weatherizing system. A durable outer facing material can be added to the aerogel material. It is to be noted here that such facing materials need not be impermeable to water and air.

In another embodiment of the present invention, a water vapor permeable material can be molecularly attached to the aerogel structure. Several polymeric materials can be used for such purpose. They can be inherently hydrophobic due to the nature of the polymer or hydrophobicity can be added in the matrix by adding silylation groups. Manufacture of such silica-polymer hybrid materials in aerogel form is described in U.S. patent application Ser. Nos. 11/030,395 and 11/030,014 which are incorporated by reference here. Such new materials will have vapor permeation, and water and air resistance due to hydrophobicity of the matrix and the tortuous pore matrix in the aerogel. In certain cases, the material can be designed to be ultra water repellant. In other embodiments, it may be advantageous to use a hydrophilic aerogel material.

In an additional aspect, the invention provides a building construction material comprising an aerogel material wherein the water vapor transfer rate (WVTR) of said construction material is at least about 5 perms. In this aspect, the aerogel material may be used alone, and thus in place of other non-aerogel materials used as building wrap. In some embodiments, the aerogel material has a WVTR from at least about 1 perm to about 8 perms or more. Of course embodiments with a WVTR of about 2, about 3, about 4, about 5, about 6 or about 7 may also be prepared and used. In such materials, the air penetration is about 0.1 cfm/ft$^2$ at 75 Pa or less, such as down to about 0.05 cfm/ft$^2$ at 75 Pa or less. In another embodiment, the air penetration is about 0.003 cfm/ft$^2$ per inch at 200 kPa.

Representative Embodiments of the Invention

In a first embodiment, a building construction material is provided which comprises at least a layer of breathable material which is substantially impervious to air and water and permeable to water vapor is combined with an aerogel material. The combined product may be in a flexible wrap form for the purposes of a building wrap or a home wrap or in the form of rigid tiles or panels for flooring, ceiling or roofing. The breathable material may be polymeric in nature.

In a second embodiment, the building construction material comprises a fibrous material added to the breathable material and the aerogel material. Fibrous material can be combined with either the breathable material or the aerogel material to form composite structures which further can be used in the practice of the invention. Optionally, such fibrous materials can be made of thermoplastic materials.

In the first and second embodiments, the aerogel material may be combined with the breathable material which is in a fibrous mat form. In other embodiments, more than one layer of breathable material can be combined or laminated with one or more layers of aerogel. Alternatively, more than one layer of aerogel can be combined or laminated with one or more layers of breathable materials. Fibers can be optionally added. In a third embodiment, aerogel material can be combined or laminated with cellulosic material like paper to make a paper board comprising aerogel. The paper board is yet another exemplification of a building construction material of the invention.

Components that protect the building from ultra violet radiation, or ozone or infra red radiation can be optionally added with any of the embodiments described above and below. These components can be added with the aerogel material, fibrous material or with the breathable material. Alternatively, they can be added while said materials are combined or laminated to make the materials of the present invention.

In the embodiments described above and below, building construction materials of the invention are designed and if needed, combined with other materials known in the art to provide the optimum thermal insulation, acoustical insulation or both.

In the embodiments described above and below, water vapor permeation may be designed to be either bidirectional or unidirectional. Depending on the circumstance and in a building envelope, for most of the cases, it is very important to get any water vapor from the inside to the outside environment and not the other way around. However, in some cases, it may need to have bidirectionality. In some embodiments, unidirectionality is provided by the characteristics of the water vaper permeable material used.

In the embodiments described above and below, the building construction material can be combined with a structural element. Such combinations would also be optionally made load bearing.

In the embodiments described above and below, the breathable, substantially air and water impermeable and water vapor permeable material may comprise a polyolefin and preferably a polyethylene, polypropylene or polybutylene. They may be prepared from continuous fibers of such materials using a flash spinning followed by bonding with heat and pressure. Other materials like polystyrene, expanded polystyrene, polyester, acrylic, polycarbonate, fluoropolymers, fluorinated urethane, PTFE, expanded PTFE, phenol-formaldehyde, melamine-formaldehyde, a phenolic resin, or copolymers thereof, individually or in combinations can be used to manufacture the breathable materials used in several embodiments of the present invention. Breathable material can be in the form of a microporous composite such as R-Wrap™ obtained from Simplex products.

In the embodiments described above and below, components can be combined through several ways including, without limitation, lamination. Such laminations can be performed with an adhesive, a resin, a heat treatment or combinations thereof. The laminations may be extrusion, adhesive, flame, ultrasonic or thermal based. The resultant materials of the embodiments can be optionally transparent or translucent (i.e. less than 100% transparent). FIG. 3 illustrates an example of a material produced from the embodiments of the present invention. Breathable material 1 and aerogel material 2 are laminated together. In FIG. 4. aerogel material 2 is sandwiched between two breathable materials and laminated together.

In the embodiments described above and below, the material of the embodiments may contain components like polyurethanes, fiber glass or other known insulation materials.

In the embodiments described above and below, the materials of the invention may also comprise polyethylene, polypropylene, polybutylene polystyrene, expanded polystyrene, polyester, acrylic; polycarbonate, fluoropolymers, fluorinated urethane, PTFE, expanded PTFE, phenol-formaldehyde, melamine-formaldehyde, a phenolic resin, or copolymers thereof, carbon, carbon black, titania, iron oxides, gypsum and cellulosic material including paper.

In the embodiments described above and below, the fibrous materials used in the embodiments may be in a mat, felt, batting, yarn, woven fabric or other related forms.

In the embodiments described above and below, the materials of the embodiments are designed to have a high water vapor transfer rate (WVTR). In some embodiments, WVTR can be at least about 1 perm to about 8 perms or more. Of course embodiments with a WVTR of about 2, about 3, about 4, about 5, about 6 or about 7 may also be prepared and used. In another embodiment, the air penetration is about 0.1 cfm/ft$^2$ at 75 Pa or less, such as down to about 0.05 cfm/ft$^2$ at 75 Pa or less. In additional embodiments, the air penetration is about 0.003 cfm/ft$^2$ per inch at 200 kPa.

In the embodiments described above and below, the materials of the present invention may be made in a flexible wrappable form, known to a person of ordinary skill in the art as "home wrap" or "building wrap". Alternatively, they can be formed into a rigid panel or tile. Such panels or tiles may be used in roofing, flooring or ceilings.

The thickness of the breathable material used in embodiments of the invention described above and below may be from about 0.25 mils to about 1000 mils. The thickness of the aerogel material used may be from about 0.01 mm to about 100 mm. However, if thicker aerogel materials are required, multiple layers of said aerogel material can be used effectively increasing the thickness only to space and cost limitations.

The materials of embodiments described above and below may have a thermal insulation R value of at least about 2 per inch and preferably at least about 5 per inch and most preferably at least about 7 per inch. In some embodiments, they can be as high as about 11 per inch.

In the embodiments described above and below, mold or mildew resistant materials may be added to any of the components of the embodiments.

Any and many of the building construction materials can be manufactured using the embodiments disclosed herein for a variety of building purposes. They can be a roofing material, a ceiling material, a flooring material, a wall element, a window element, or an element to go around the periphery of windows.

In the embodiments described above and below, an aerogel precursor can be infused with a polymeric structure that has vapor permeating properties. Such a structure can be further dried in a manner similar to the way an aerogel blanket is dried. In other embodiments, an aerogel material is coated with a polymeric material such that the resulting material provides vapor permeation and material handling properties.

The materials of the present invention can be used to insulate building structures like walls, roof, fenestration, ducts, heating and cooling pipes etc. Building structures or envelopes can be pre-built with such insulation material incorporated into such structures. Such insulations will have a minimum of an R Value 2 per inch, preferably about 5 per inch.

Various methods may be used to manufacture the materials of the embodiments. In a simple way, lamination may be used to combining a breathable barrier material and aerogel material. In such cases, aerogel material may be in a sheet or blanket form. Alternatively, particles or beads of aerogels may be embedded in a breathable barrier matrix. In yet another alternative, breathable barrier material may be used in the process of manufacturing an aerogel type composite material which could be blanket like.

If lamination is used, an adhesive may be optionally used and optionally heat treated. Heat treatment can be performed without the adhesive. Such systems would preferably use thermoplastic materials which on heat treatment act as binders. Laminations of different type are known and described in several publications. Paper and textile industry uses such processes and equipments which can be adopted for the purposes of practicing the embodiments described herein. The processes used or adopted to be used for practicing several embodiments of the present invention can also be found in books like Fundamentals of Modern Manufacturing: Materials, Processes, and Systems, 2nd Edition, Mikell P. Groover, Wiley, NY, 2001 or Materials and Processes in Manufacturing, E. Paul DeGarmo et al. Wiley, Ny, 2002. which are incorporated by reference here.

When describing the breathable material as substantially air and water impermeable, it is clearly stated herein that water can be any liquid and the materials would have a substantial impermeability to such liquids. In a similar way, they may be permeable to vapors of such liquids and preferably in one direction.

It is noted that although the embodiments disclosed herein describe the use of materials as building wraps, it need not mean that they are wrapped all around the building. It might be optimal to wrap around, or cover, certain major heat leaking or air leaking locations in the building to achieve an overall water vapor permeation or insulation.

In describing embodiments of the present invention, specific terminology is used for the sake of clarity. For purposes of description, each specific term is intended to at least include all technical and functional equivalents that operate in a similar manner to accomplish a similar purpose. Additionally, in some instances where a particular embodiment of the present invention includes a plurality of system elements or method steps, those elements or steps may be replaced with a single element or step; likewise, a single element or step may be replaced with a plurality of elements or steps that serve the same purpose. Moreover, while this invention has been shown and described with references to particular embodiments thereof, those skilled in the art will understand that various other changes in form and details may be made therein without departing from the scope of the invention.

Although only some combinations of embodiments are claimed in the current disclosure, the current disclosure teaches the practice of all combinations of embodiments which are referenced by individual claims. For the purposes of disclosure, it is understood that all such combinations of claims are hereby taught to be practicable as per the current disclosure.

What is claimed is:

1. A material comprising a component permeable to water vapor and substantially impervious to water, in a sheet or substantially planar form comprising essentially two planar surfaces wherein one surface is attached to a monolithic aerogel.

2. A material comprising a component permeable to water vapor and substantially impervious to water, in a sheet or substantially planar form comprising essentially two planar surfaces wherein one surface is attached to a monolithic aerogel, wherein
    a) said component permeable to water vapor is substantially impervious to air and optionally in a building wrap form; or
    b) said component permeable to water vapor is a polymeric material substantially impervious to air and water, and said material is optionally in a building wrap form; or
    c) said material is breathable and further comprises a fibrous support material; or
    d) said component is present as two breathable layers; or
    e) said component permeable to water vapor is a cellulosic material.

3. The material of claim 1 further comprising a component to protect against ultraviolet radiation or ozone; or
    wherein the material has thermal insulation properties; or
    wherein the material provides acoustic insulation; or
    wherein the aerogel is hydrophilic; or
    wherein the aerogel is hydrophobic; or
    wherein the aerogel is water repellant; or
    wherein the water vapor permeability is unidirectional; or
    wherein the water vapor permeability is bidirectional; or
    further comprising a structural component; or
    wherein the water vapor permeable material is perforated; or
    wherein the water vapor permeable material comprises a polyolefin, optionally in a microporous composite form; or
    further comprising a resin; or
    further comprising an adhesive; or
    wherein the material is translucent; or
    further comprising a polyurethane component; or
    further comprising a fiber glass component; or
    further comprising a fibrous component; or
    further comprising a fibrous material, optionally in a mat, a felt or a batting form; or
    further comprising at least a component selected from polystyrene, polyethylene, polypropylene, polybutylene, expanded polystyrene, polyester, acrylic, polycarbonate, fluoropolymers, fluorinated urethane, PTFE, expanded PTFE, phenol-formaldehyde, melamine-formaldehyde, a phenolic resin, carbon black, carbon, or copolymers thereof, wood, gypsum, or combinations thereof; or
    wherein the components are laminated to each other with an adhesive; or
    wherein the components are laminated with heat; or
    wherein said material has a high water vapor transfer rate (WVTR); or
    wherein said material has a water vapor transfer rate (WVTR) of at least 1 perm; or
    wherein said material is in a building wrap form; or
    wherein the water vapor permeable component is breathable and has a thickness of about 0.25 mils to about 1000 mils; or
    wherein the thermal insulation R value of said material is at least 2 per inch; or further comprising a mold or mildew resistant agent.

4. The material of claim 2 further comprising a component to protect against ultraviolet radiation or ozone; or
    wherein the material has thermal insulation properties; or
    wherein the material provides acoustic insulation; or
    wherein the aerogel is hydrophilic; or
    wherein the aerogel is hydrophobic; or
    wherein the aerogel is water repellant; or
    wherein the water vapor permeability is unidirectional; or
    wherein the water vapor permeability is bidirectional; or
    further comprising a structural component; or
    wherein the water vapor permeable material is perforated; or
    wherein the water vapor permeable material comprises a polyolefin, optionally in a microporous composite form; or
    further comprising a resin; or
    further comprising an adhesive; or
    wherein the material is translucent; or
    further comprising a polyurethane component; or
    further comprising a fiber glass component; or
    further comprising a fibrous component; or
    further comprising a fibrous material, optionally in a mat, a felt or a batting form; or
    further comprising at least a component selected from polystyrene, polyethylene, polypropylene, polybutylene, expanded polystyrene, polyester, acrylic, polycarbonate, fluoropolymers, fluorinated urethane, PTFE, expanded PTFE, phenol-formaldehyde, melamine-formaldehyde, a phenolic resin, carbon black, carbon, or copolymers thereof, wood, gypsum, or combinations thereof; or wherein the components are laminated to each other with an adhesive; or wherein the components are laminated with heat; or wherein said material has a high water vapor transfer rate (WVTR); or wherein said material has a water vapor transfer rate (WVTR) of at least 1 perm; or wherein said material is in a building wrap form; or wherein the water vapor permeable component is breathable and has a thickness of about 0.25 mils to about 1000 mils; or wherein the thermal insulation R value of said material is at least 2 per inch; or further comprising a mold or mildew resistant agent.

5. A building element comprising the material of claim 1.

6. A building element comprising the material of claim 2.

7. A building element comprising the material of claim 1 wherein said material is a roofing material or a flooring material; or wherein said element is a wall element.

8. A building element comprising the material of claim 2 wherein said material is a roofing material or a flooring material; or wherein said element is a wall element.

9. A material comprising a monolithic aerogel wherein the water vapor transfer rate of said material is at least about 5 perms and said material is substantially impervious to water.

10. A method of manufacturing a material of claim 1 comprising:
 a) providing a component permeable to water vapor and substantially impervious to air and water; and combining the component with at least an aerogel; or
 b) providing at least a polymeric component permeable to water vapor and substantially impervious to air and water; and combining the polymeric component with at least an aerogel; or
 c) providing at least a fibrous support material; providing at least a component permeable to water vapor and substantially impervious to water; and combining said fibrous support material and said component with at least an aerogel; or
 d) providing at least a fibrous support material; providing at least a component permeable to water vapor and substantially impervious to water; combining said fibrous material with at least an aerogel; and laminating said combination with said component; or
 e) providing at least a cellulosic component permeable to water vapor and substantially impermeable to water; and combining said cellulosic component with at least an aerogel.

11. A method of weatherizing a building comprising providing at least a material of claim 1 in the envelope of the building.

12. A method of weatherizing a building comprising providing at least a material of claim 2 in the envelope of the building.

13. The method of claim 10
wherein said material further comprises a component to protect ultraviolet radiation or ozone; or wherein said material has thermal insulation properties; or wherein said material provides acoustic insulation; or wherein the aerogel is hydrophilic; or wherein the aerogel is hydrophobic; or wherein the aerogel is water repellant; or wherein the water vapor permeability is unidirectional; or wherein the water vapor permeability is bidirectional; or wherein said material further comprises a structural component; or wherein the water vapor permeable component is perforated; or wherein the water vapor permeable component comprises a polyolefin, optionally in a microporous composite form; or wherein said material further comprises a resin; or wherein said material further comprises an adhesive; or wherein said material is translucent; or wherein said material further comprises a polyurethane component; or wherein said material further comprises a fiber glass component; or wherein said material further comprises a fibrous component; or wherein said material further comprises a fibrous component, optionally in a mat, a felt or a batting form; or wherein said material further comprises at least a component selected from polystyrene, polyethylene, polypropylene, polybutylene, expanded polystyrene, polyester, acrylic, polycarbonate, fluoropolymers, fluorinated urethane, PTFE, expanded PTFE, phenol-formaldehyde, melamine-formaldehyde, a phenolic resin, carbon black, carbon, or copolymers thereof, wood, gypsum, or combinations thereof; or wherein the components are laminated to each other with an adhesive; or wherein the components are laminated with heat; or wherein said material has a high water vapor transfer rate (WVTR); or wherein said material has a water vapor transfer rate (WVTR) of at least 1 perm; or wherein said material is in a building wrap form; or wherein the water vapor permeable component is breathable and has a thickness of about 0.25mils to about 1000 mils; or wherein the thermal insulation R value of said material is at least 2 per inch; or wherein said material further comprises a mold or mildew resistant agent.

14. The material of claim 1 wherein said component permeable to water vapor is enveloped by said aerogel component.

15. The material of claim 1 wherein said component permeable to water vapor and said aerogel component are in adjacent layers of said material.

16. A material comprising a component permeable to water vapor and substantially impervious to water in a sheet or substantially planar form comprising essentially two surfaces wherein one surface is attached to a monolithic aerogel, wherein the material is in a form flexible enough for being rolled up.

17. A material comprising a component permeable to water vapor and substantially impervious to water in a sheet or substantially planar form comprising essentially two surfaces wherein one surface is laminated to a monolithic aerogel.

18. A method of forming the material of claim 1 by attaching one surface of a component permeable to water vapor and substantially impervious to water in a sheet or substantially planar form comprising essentially two surfaces to an aerogel in a substantially planar form.

19. The material of claim 9 further comprising a component to protect against ultraviolet radiation or ozone; or wherein the material has thermal insulation properties; or wherein the material provides acoustic insulation; or wherein the aerogel is hydrophilic; or wherein the aerogel is hydrophobic; or
wherein the aero gel is water repellant; or
wherein the water vapor permeability is unidirectional; or
wherein the water vapor permeability is bidirectional; or
further comprising a structural component; or
wherein the water vapor permeable material is perforated; or
wherein the water vapor permeable material comprises a polyolefin, optionally in a microporous composite form; or
further comprising a resin; or
further comprising an adhesive; or
wherein the material is translucent; or
further comprising a polyurethane component; or
further comprising a fiber glass component; or
further comprising a fibrous component; or
further comprising a fibrous material, optionally in a mat, a felt or a batting form; or
further comprising at least a component selected from polystyrene, polyethylene, polypropylene, polybutylene, expanded polystyrene, polyester, acrylic, polycarbonate, fluoropolymers, fluorinated urethane, PTFE, expanded PTFE, phenol-formaldehyde, melamine-formaldehyde, a phenolic resin, carbon black, carbon, or copolymers thereof, wood, gypsum, or combinations thereof; or
wherein the components are laminated to each other with an adhesive; or
wherein the components are laminated with heat; or
wherein said material has a high water vapor transfer rate (WVTR); or
wherein said material has a water vapor transfer rate (WVTR) of at least 1 perm; or
wherein said material is in a building wrap form; or
wherein the water vapor permeable component is breathable and has a thickness of about 0.25 mils to about 1000 mils; or
wherein the thermal insulation R value of said material is at least 2 per inch; or
further comprising a mold or mildew resistant agent.

* * * * *